R. SCHULZE.
WHEELBARROW.
APPLICATION FILED SEPT. 26, 1913.

1,095,036.

Patented Apr. 28, 1914.

Witnesses
Orie G. Flannagan,
R. M. Smith.

Inventor
R. Schulze
By Victor J. Evans
Attorney

UNITED STATES PATENT OFFICE.

RINHOLT SCHULZE, OF HUMBOLDT, IOWA.

WHEELBARROW.

1,095,036.      Specification of Letters Patent.      Patented Apr. 28, 1914.

Application filed September 26, 1913. Serial No. 792,014.

*To all whom it may concern:*

Be it known that I, RINHOLT SCHULZE, a citizen of the United States, residing at Humboldt, in the county of Humboldt and State of Iowa, have invented new and useful Improvements in Wheelbarrows, of which the following is a specification.

This invention relates to wheelbarrows and has for its object to produce what may be termed an extension wheelbarrow or in other words a wheelbarrow which may be lengthened and shortened in accordance with the desired capacity and the nature of the material to be transported thereby.

With the above general objects in view, the invention consists in the construction, combination and arrangement of parts, as will hereinafter be more fully described, illustrated and claimed.

Figure 1:
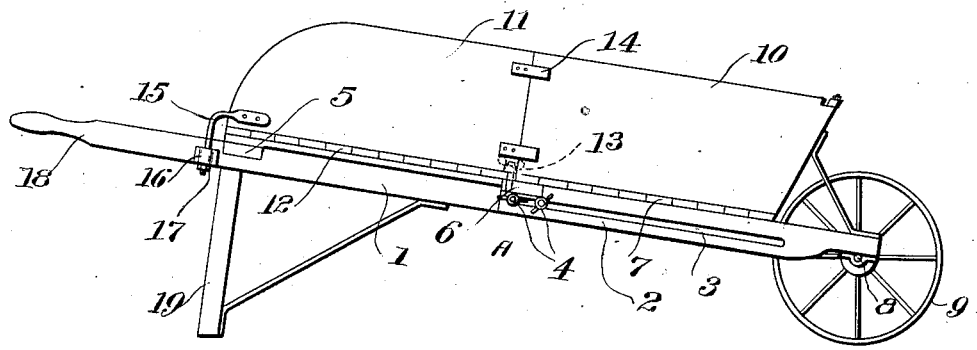
Figure 2:
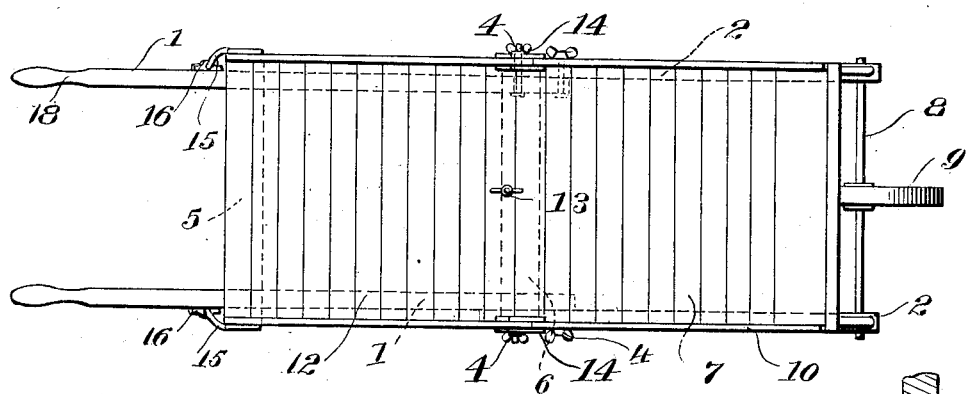
Figure 3:
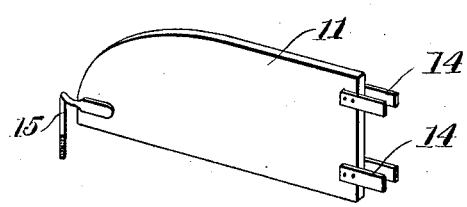
Figure 4:
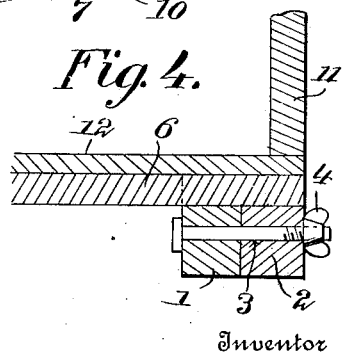

In the accompanying drawings: Figure 1 is a side elevation of an extension wheelbarrow embodying the present invention. Fig. 2 is a plan view of the same. Fig. 3 is a detail perspective view of one of the extension side boards. Fig. 4 is a detail vertical cross section showing the connection between the side frame bars.

The extension wheelbarrow contemplated in this invention embodies two substantially parallel side frame bars designated generally at A, each side bar comprising the two sections 1 and 2 which bear an overlapping and slidable relation to each other. One of the sections 2 is formed with a slot 3 extending lengthwise thereof while the other section 1 is provided with a thumb screw or bolt 4 passing through one end thereof and also through the slot 3 in the section 2, thus providing for the lengthening and shortening of the side frame bars of the wheelbarrow.

The frame bar sections 1 are connected at one end by a cross bar 5 while the sections 2 are connected at their corresponding ends by a cross bar 6 also forming a support for one end of a bottom or floor 7 covering the forward portion of the wheelbarrow as shown in the drawings. The opposite ends of the sections 2 support the shaft 8 which carries the wheel 9 of the wheelbarrow.

10 designates the side boards of the permanently floored section of the wheelbarrow and 11 designates extension side boards which close in the sides of the other section of the wheelbarrow, 12 designating a detachable floor for that section of the wheelbarrow next to the operator, the section 12 of the floor forming a complemental portion of the other section 7. The floor section 12 is movable in order to allow the wheelbarrow to be telescoped or shortened by the means hereinabove described and said section 12 is formed with an opening to receive a thumb screw 13 by means of which said floor section may be secured in place.

In order to hold the extension sides 11 in proper position, said extension sides are provided with bifurcated clips 14 which embrace the abutting edges of the other side boards 10 as shown in Fig. 1 while at their opposite ends the extension sides 11 are provided with L-shaped bolts 15 which are insertible downwardly through eyes 16 at the extremities of the sections 1 of the side frame bars. Nuts 17 may be threaded on the bolts 15 to prevent the extension sides 11 from working loose.

18 designates handle bars similar to those found on wheelbarrows in present use and 19 designates supporting legs constructed and arranged in the usual manner.

From the foregoing description it will be seen that the wheelbarrow as a whole may be lengthened and shortened to suit requirements and in accordance with the nature of the load or material being carried thereby. Bottom sections 12 of different sizes may be interchangeably used in lengthening and shortening the wheelbarrow and extension sides 11 of corresponding length may also be provided thus adapting the wheelbarrow to a variety of uses.

What I claim is:

A wheelbarrow comprising oppositely arranged side frame bars each embodying a plurality of sections having an overlapping and slidable relation to each other, means for fastening the relatively slidable sections of said side frame bars, a permanent floor connecting certain sections of said side bars, a detachable floor between the remaining sections thereof, and detachable extension side boards having means for fastening the same in place relatively to the frame of the wheelbarrow.

In testimony whereof I affix my signature in presence of two witnesses.

RINHOLT SCHULZE.

Witnesses:
L. M. HOUSE,
ERIC SCHULTZE.

Copies of this patent may be obtained for five cents each, by addressing the "Commissioner of Patents, Washington, D. C."